United States Patent [19]
Packard

[11] Patent Number: 6,006,238
[45] Date of Patent: Dec. 21, 1999

[54] METHOD AND APPARATUS FOR MIGRATING/SHADOWING DATA BETWEEN A SERVER AND ITS CLIENTS

[75] Inventor: Keith R. Packard, Portland, Oreg.

[73] Assignee: Network Computing Devices, Inc., Mountain View, Calif.

[21] Appl. No.: 08/792,651

[22] Filed: Jan. 31, 1997

[51] Int. Cl.$^6$ ............................. G06F 15/00; G06F 17/30
[52] U.S. Cl. .......................... 707/200; 707/205; 709/203; 709/226
[58] Field of Search ...................................... 700/200, 204, 700/10, 201; 395/200.72, 200.54, 200.09, 675; 709/203, 226

[56] References Cited

U.S. PATENT DOCUMENTS

| | | | |
|---|---|---|---|
| 5,506,987 | 4/1996 | Abramson et al. | 395/650 |
| 5,634,052 | 5/1997 | Morris | 395/601 |
| 5,637,698 | 6/1997 | Webber et al. | 395/800 |
| 5,644,766 | 7/1997 | Coy et al. | 395/620 |
| 5,678,042 | 10/1997 | Pisello et al. | 395/610 |
| 5,686,730 | 11/1997 | Laudon et al. | 362/52 |
| 5,734,922 | 3/1998 | Hagersten et al. | 395/800.37 |
| 5,737,536 | 4/1998 | Hermann et al. | 395/200.59 |
| 5,745,758 | 4/1998 | Shaw et al. | 395/672 |
| 5,758,355 | 5/1998 | Buchanan | 707/201 |
| 5,790,447 | 8/1998 | Laudon et al. | 365/52 |
| 5,881,311 | 3/1999 | Woods | 395/824 |

OTHER PUBLICATIONS

Lai et al. "Load Balancing in Distributed Shared Memory Systems" IEEE Database, pp. 152–158, Jan. 1997.

Balter et al. "Exploiting Process Lifetime Distributions for Dynamic Load Balancing" Sigmetrics, pp. 13–24, May 1996.

McCann et al. "Dynamic File Migration to Support Parallel Database Systems" IEEE Database, pp. 352–356, Apr. 1995.

Rana et al. "Migrating Controller Based Framework for Mutual Exclusion in Distributed Systems" IEEE, pp. 1–7, Jul. 1995.

Maa et al. "A Hierarchical Directory Scheme for Large-Scale Cache Coherent Multiprocessors" IEEE, pp. 43–46, Oct. 1992.

Bellow et al. "Update Propogation in Distributed Memory Hierarchy" IEEE, pp. 521–528, Jul. 1990.

Arneson "Development of Omniserver" IEEE, pp. 88–93, Sep. 1990.

*Primary Examiner*—Paul V. Kulik
*Attorney, Agent, or Firm*—Blakely Sokoloff Taylor & Zafman, LLP

[57] ABSTRACT

A server is provided with operating logic that dynamically migrates or shadows data it shares with its client, in accordance with a migration/shadowing policy that is based on one or more migration/shadowing heuristics. The server is also provided with operating logic that creates the shared data in accordance with a creation policy that is based on one or more creation heuristics. Furthermore, the server is provided with operating logic that maintains the migration/shadowing as well as the creation heuristics in accordance with an update policy. In one embodiment where the data are pixel maps, the migration/shadowing and creation heuristics are corresponding local usage counts, one per pixel map, and a global usage count respectively. The usage counts are incremented and decremented depending on the destinations of the pixel maps of interest.

23 Claims, 6 Drawing Sheets

METHOD AND APPARATUS FOR MIGRATING/SHADOWING DATA BETWEEN A SERVER AND ITS CLIENTS

BACKGROUND OF THE INVENTION

1. Field of the Invention

The present invention relates to the field of computer systems. More specifically, the present invention relates to art of data management in a networked computing environment.

2. Background Information

Networked client/server computing is known in the art. With recent advances in networking and related technologies, there is increasing interest in networked computing that is even more server reliant than in the past. For example, there is increasing interest in network computing that employs "minimally equipped" clients, with a server providing most of the processing for the "minimally equipped" clients. Particular examples of such "minimally equipped" clients include Explora, manufactured by Networking Computing Devices, Inc. of Mountain View, Calif. assignee of the present invention, and Network Station, sold by IBM of Armonk, N.Y.

Historically, there is little if any coordination in managing data shared by both the server and its clients. Typically, in response to a client's request, a server performs the processing necessary to service the request, and returns the response data, if any, to the client. Upon returning the response data, the server may or may not preserve the response data or any of the working data in anticipation of subsequent requests. Whichever the case may be, the action is taken unilaterally. In the meantime, the client uses the response data as its need dictates. In like manner, the client may or may not preserve the response data, upon "using" it, and the action is also taken unilaterally. In other words, the post response actions of the server and its clients are uncoordinated.

As a result, the response data may be stored in the server only, on both the server as well as the client, or on the client. Depending on the application, each of the three cases may be an inefficient approach to storing the response data. For example, if the application is unlikely to require the response data to be updated, it is inefficient to continue to store the data on the server. It is especially inefficient if the data is stored in the server only, and the same data is required by the client over and over again. Similarly, if the application is likely to require the response data to be updated, it is inefficient to store the data on the client. It is especially inefficient if the data is stored in the client only, and the update operation requires the current state of the data to be provided to the server again.

This problem is especially critical in networked client/server computing involving "minimally equipped" clients that heavily depend on the server, where large volume of data (e.g. pixel maps) are generated by the server and provided to the client, and the likelihood of the server having to update the data can not be predetermined. Thus, a more efficient approach that optimizes the consumption of the computing capacity of the server and the bandwidth available on the network is desired. In view of this and other desired results, the subject data migration/shadowing method and apparatus is invented.

SUMMARY OF THE INVENTION

A server is provided with operating logic that dynamically migrates or shadows data it shares with its client, in accordance with a migration/shadowing policy that is based on one or more migration/shadowing heuristics. The server is also provided with operating logic that creates the shared data in accordance with a creation policy that is based on one or more creation heuristics. Furthermore, the server is provided with operating logic that maintains the migration/shadowing as well as the creation heuristics in accordance with an update policy.

The migration/shadowing policy specifies shadowing data stored in the server/client on the client/server if the migration heuristics indicate a constructive equivalent of usage by the server and the client. The migration/shadowing policy specifies migration of the data onto the server only if the migration heuristics indicate constructively more usage by the server over the client, and migration of the data onto the client only if the migration heuristics indicate constructively more usage by the client over the server.

The creation policy specifies creation of a new data on both the server and the client if the creation heuristics indicate a constructive equivalent likelihood of usage by the server and the client. The creation policy specifies creation of the new data on the server only if the creation heuristics indicate constructively more likelihood of usage by the server over the client, and creation of the new data on the client only if the creation heuristics indicate constructively more likelihood of usage by the client over the server.

In one embodiment, the shared data are pixel maps generated by the server for rendering by the client. The migration/shadowing heuristics on which the storage policy is based include a plurality of local usage counts, one per pixel map, whereas the creation heuristics on which the creation policy is based include a global usage count. The update policy specifies increment of the corresponding local usage count as well as the global usage count, each time a pixel map of interest is used by the client, and decrement of the two counts if the pixel map of interest is used by the server instead. For the embodiment, the increments and decrements are constrained by a ceiling and a floor limit respectively.

The migration/shadowing policy specifies shadowing of a pixel map stored on the server/client on the client/server if the corresponding local usage count indicate a constructive equivalent of usage by the server and the client. The migration/shadowing policy specifies migration of the pixel map onto the server only if the corresponding local usage count indicates constructively more usage by the server over the client, and migration of the pixel map onto the client only if the corresponding local usage count indicates constructively more likelihood of usage by the client over the server.

The creation policy specifies creation of a new pixel map on both the server and the client if the global usage count indicate a constructive equivalent likelihood of usage by the server and the client. The creation policy specifies creation of the new pixel map on the server only if the global usage count indicates constructively more likelihood of usage by the server over the client, and creation of the pixel map on the client only if the global usage count indicates constructively more likelihood of usage by the client over the server.

BRIEF DESCRIPTION OF DRAWINGS

The present invention will be described by way of exemplary embodiments, but not limitations, illustrated in the accompanying drawings in which like references denote similar elements, and in which.

Nomenclature and Terminology

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system include general purpose as well as special purpose data processing machines, systems, and the like, that are standalone, adjunct or embedded. Additionally, part of the descriptions will be presented referring to the term pixel maps. For the purpose of this application, the term pixel map is intended to include also bit map, where bit map is a special "degenerate" case of pixel map with only two colors, e.g., black and white.

DETAILED DESCRIPTION OF THE INVENTION

In the following description, for ease of explanation and understanding, the present invention will be described in detail in terms of a pixel map embodiment. However, the present invention may be practiced with other data shared between a server and its clients. Furthermore, various aspects of the pixel map embodiment will be described, however, the present invention may be practiced without some of the aspects described. In particular, specific numbers, materials and configurations will be set forth in order to provide a thorough understanding. Nevertheless, the present invention may be practiced without the specific details. In other instances, well known features will be omitted or simplified in order not to obscure the present invention. Various operations will be described as multiple discrete steps in turn in a manner that is most helpful in understanding the present invention. However, the order of description should not be construed as to imply that these operational steps are necessarily order dependent. In particular, the operational steps need not be performed in the order they are presented.

Figure 1:
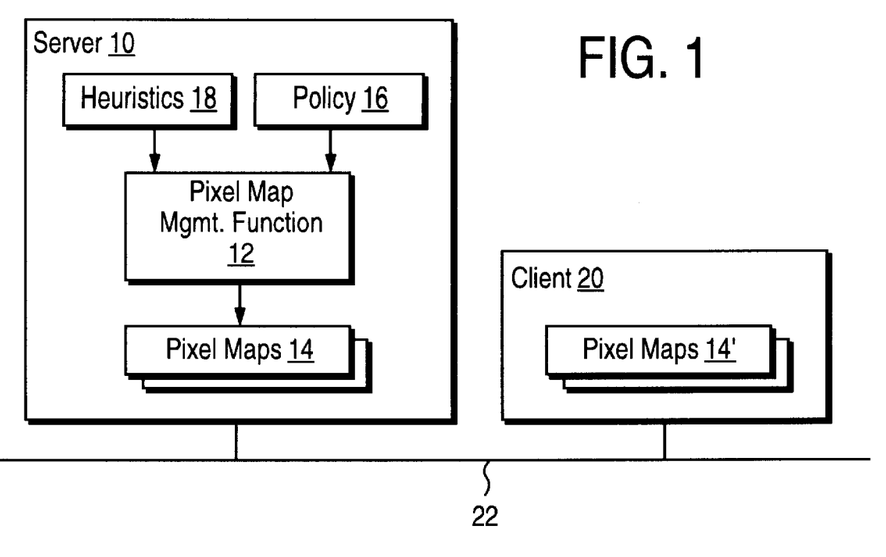
FIG. 1 illustrates one embodiment of the present invention.

Referring now to FIG. 1, wherein one embodiment of the present invention is shown. As illustrated, the present invention includes server 10 programmed with pixel map management function 12 that creates and manages storage of pixel maps 14 (which are shared with client 20) in accordance with policies 16. Policies 16 specify the action to be taken in terms of heuristics 18. Server 10 and client 20 are coupled to each other via network 22. For the illustrated embodiment, pixel map management function 12 of server 10 maintains a pixel map 14 in server 10 only under a first migration/shadowing condition, in both server 10 and client 20 under a second migration/shadowing condition, and in client 20 only under a third migration/shadowing condition. Pixel map management function 12 dynamically determines the migration/shadowing condition in accordance with a migration/shadowing one of policies 16. Pixel map management function 12 further creates pixel maps 14 in accordance with a creation one of policies 16, and manages heuristics 18 in accordance with an update one of policies 16. In other words, for the illustrated embodiment, policies 16 include a migration/shadowing policy, a creation policy, and an update policy.

Except for pixel map management function 12, policies 16 and heuristics 18, which will be described more fully below, server 10 is intended to represent a broad category of servers known in the art. A particular example will be described later. Both client 20 and network 22 are intended to represent a broad category of these elements known in the art also. Their functions and constitutions are well known. Accordingly, client 20 and network 22 will not be further described.

Figure 2:
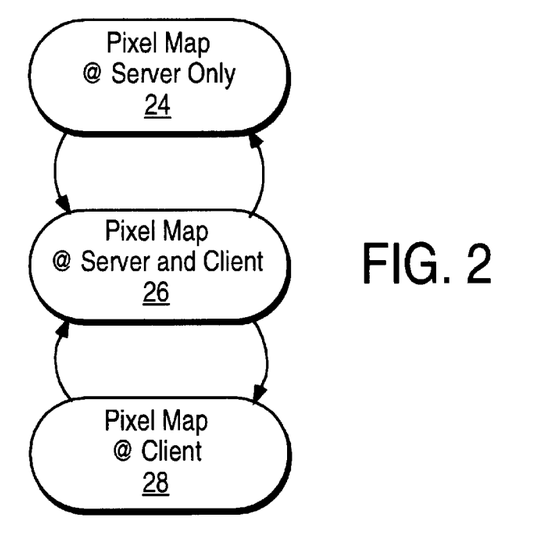
FIG. 2 illustrates the storage states of the pixel maps of FIG. 1.

FIG. 2 illustrates the migration/shadowing states of a pixel map 14 in further details. As shown and described earlier, the migration/shadowing state of each pixel map 14 is either in "server only" state 24, "both server and client" state 26, or "client only" state 28. For the illustrated embodiment, from "server only" state 24, the migration/shadowing state either remains in "server only" state 24 or transitions into "server and client" state 26. From "both server and client" state 26, the migration/shadowing state either remains in "both server and client" state 26, transitions back to "server only" state 24, or transitions into "client only" state 28. From "client only" state 28, the migration/shadowing state either remains in "client only" state 28 or transitions back to "server and client" state 26. In other alternate embodiments, direct transitions between "server only" state 24 and "client only" state 28 are also provided.

Figure 3:
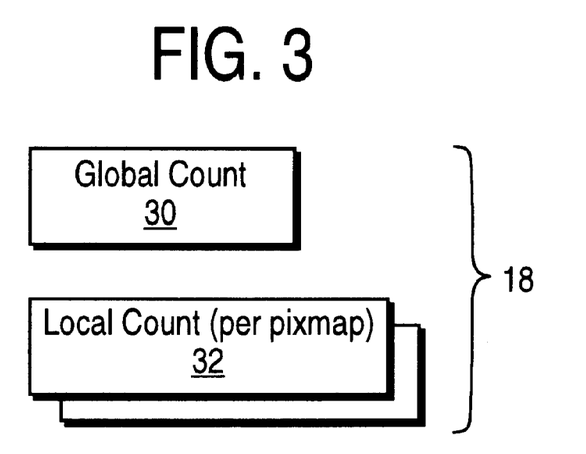
FIG. 3 illustrates an exemplary set of heuristics.

FIG. 3 illustrates an exemplary set of heuristics 18. As shown, exemplary heuristics 18 include global usage count 30, and local usage counts 32. For the illustrated embodiment, one local usage count 32 is employed for each pixel map 14. However, in alternate embodiments, one "local" usage count 32 may be provided for multiple ones of pixel maps 14 instead. Global usage count 30 denotes net usage of all pixel maps 14 by client 20 over server 10, whereas each local usage count 32 denotes net usage of the corresponding pixel map 14 by client 20 over server 10. In other words, global usage count 30 reflects the overall relative likelihood of any pixel map 14 being used by client 20 versus by server 10, whereas each local usage count 32 reflects the relative likelihood of a particular pixel map 14 being used by client 20 versus by server 10. Clearly, other heuristics may be employed to represent the relative likelihood of interest, as well as other migration/shadowing factors. For the illustrated embodiment, for computational efficiency, updates of both usage counts 30 and 32 are constrained by a ceiling as well as a floor limit value. The magnitude of these values are application dependent, and may be empirically determined.

Figure 4:
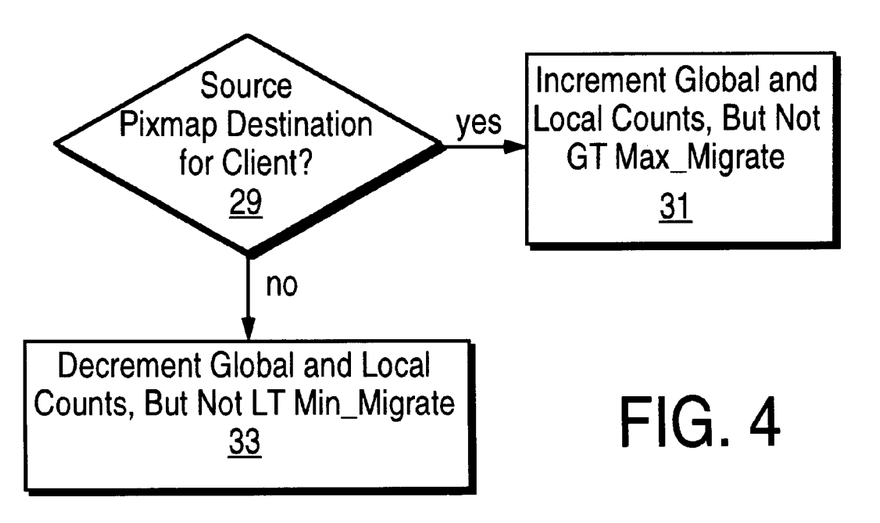
FIG. 4 illustrates an exemplary update policy.

FIG. 4 illustrates one embodiment of the update policy. As shown, for the illustrated embodiment, the update policy specifies both global and the appropriate local usage counts 30 and 32 are to be incremented whenever a pixel map 14 of interest is used by client 20, step 31, and decremented whenever the pixel map 14 of interest is used by server 10, step 33. As described earlier, for the illustrated embodiment, increments and decrements of both usage counts 30 and 32 are constrained by a ceiling and a floor limit value respectively. The ceiling and floor limit values will also be referred to as the "Max Migrate" and the "Min Migrate" value hereinafter (Max Migrate>Min Migrate).

Figure 5:
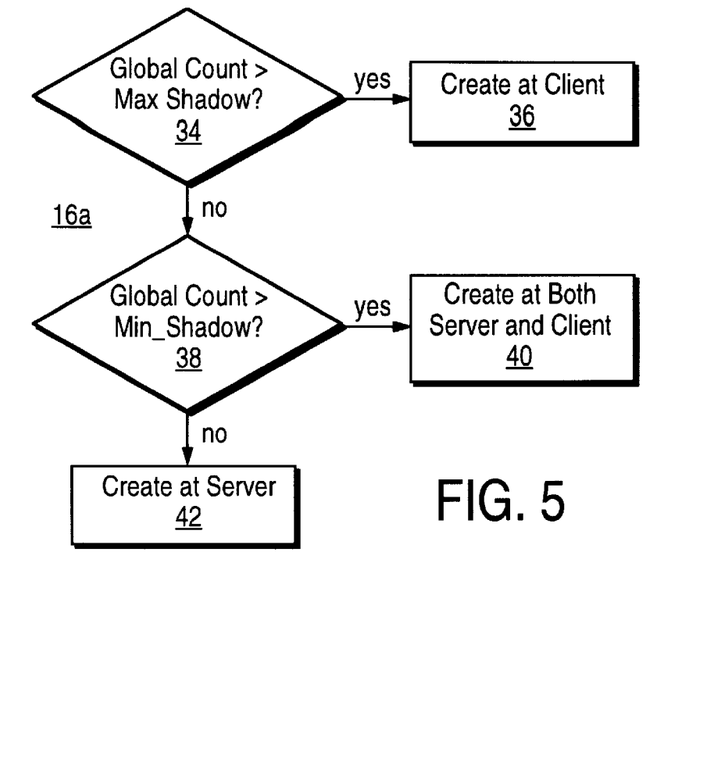
FIG. 5 illustrates an exemplary creation policy.

FIG. 5 illustrates one embodiment of the creation policy. As shown, for the illustrated embodiment, the creation policy specifies a new pixel map 14 is to be created on client 20 only if global usage count 30 is between a first intermediate value "Max Shadow" and "Max Migrate", step 36. The creation policy further specifies a new pixel map 14 is to be created on both server 10 and client 20 if the global usage count 30 is between "Max Shadow" and a second intermediate value "Min Shadow", step 40, and on server 10 only if the global usage count 30 is between "Min Shadow" and "Min Migrate", step 42 (Max Migrate>Max Shadow>Min Shadow>Min Migrate).

Figure 6:
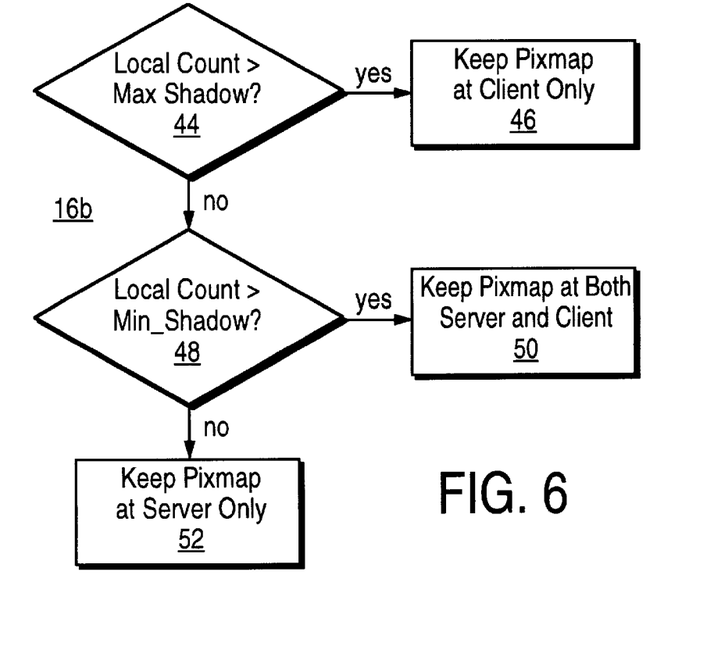
FIG. 6 illustrates an exemplary migration/shadowing policy.

FIG. 6 illustrates one embodiment of the migration/shadowing policy. As shown, for the illustrated embodiment, the operational policy specifies a pixel map 14 of interest is to be maintained on client 20 only if the corresponding local usage count 32 is between "Max Shadow" and "Max Migrate", step 46. The migration/shadowing policy further specifies the pixel map 14 of interest is to be maintained on both server 10 and client 20 if the corresponding local usage count 30 is between "Max Shadow" and "Min Shadow", step 50, and on server 10 only if the corresponding local usage count 30 is between "Min Shadow" and "Min Migrate", step 52.

Figure 7:
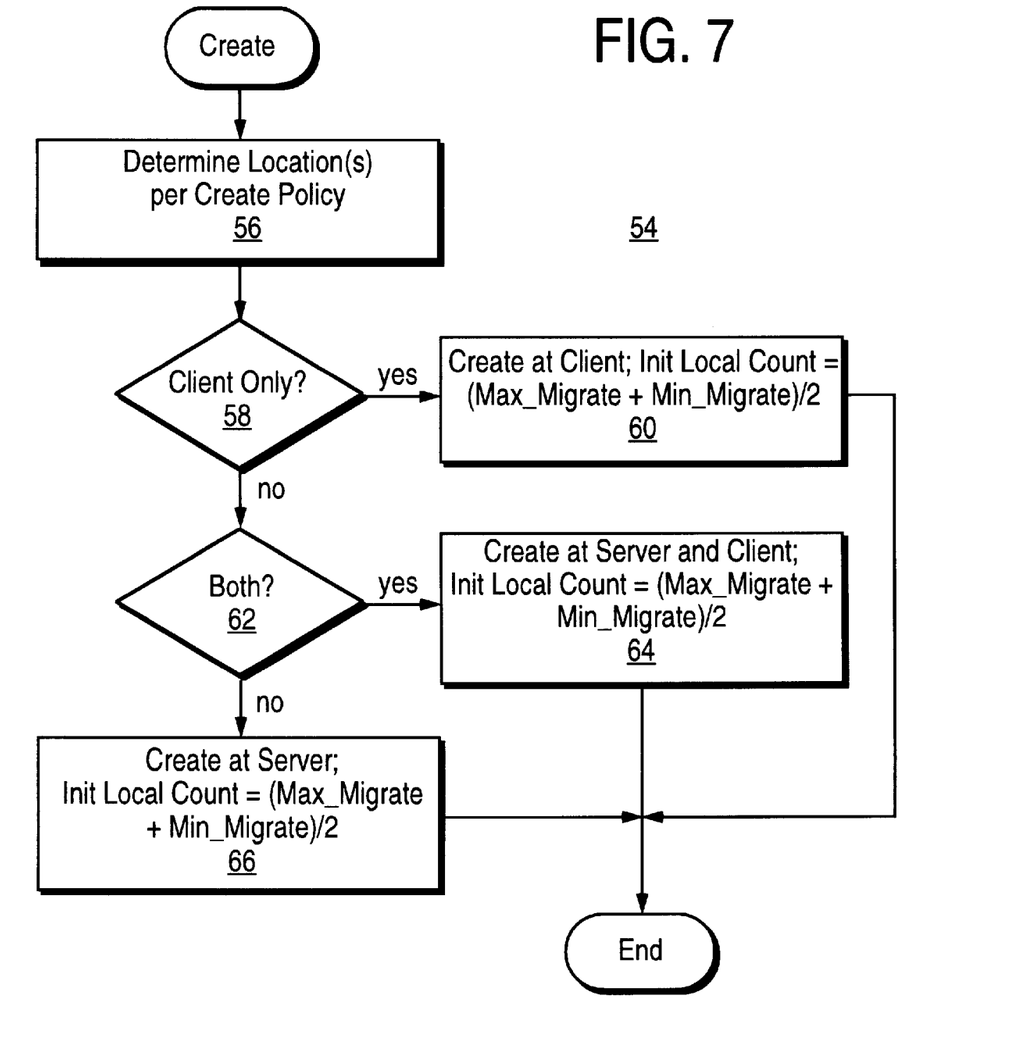
FIG. 7 illustrates one embodiment of the operation flow for creating a pixel map.

FIG. 7 illustrates one embodiment of the operational flow of pixel map management function 12 (hereinafter simply management function 12) for creating a new pixel map. As shown, for the illustrated embodiment, upon receipt of a request for creating a pixel map, management function 12 determines the location(s) for creating the pixel map in accordance with a creation policy, step 56. For the above described exemplary creation policy, management function 12 determines if the current value for global usage count 30 is between Max Migrate and Max Shadow, between Max Shadow and Min Shadow, or between Min Shadow and Min Migrate. If the determination result indicates that the pixel map is to be created on client 20 only (e.g. Max Migrate>global usage count 30>Max Shadow), management function creates the pixel map accordingly, step 60. Furthermore, for the illustrated embodiment, management function 12 initializes the local usage count 32 for the newly created pixel map to (Max Migrate+Min Migrate)/2. In alternate embodiments, other initial values may be employed. On the other hand, if the determination result indicates that the pixel map is to be created on both server 10 and client 20 (e.g. Max Shadow>global usage count 30>in Shadow), management function creates the pixel map accordingly, step 64. Furthermore, for the illustrated embodiment, management function 12 initializes the local usage count 32 for the newly created pixel map to (Max Migrate+Min Migrate)/2. Similarly, in alternate embodiments, other initial values may be employed. Finally, if the determination result indicates that the pixel map is to be created on server 10 only (e.g., Min Shadow>global usage count 30>Min Migrate), management function creates the pixel map accordingly, step 66. Furthermore, for the illustrated embodiment, management function 12 initializes the local usage count 32 for the newly created pixel map to (Max Migrate+Min Migrate)/2. Similarly, in alternate embodiments, other initial values may be employed.

Figure 8:
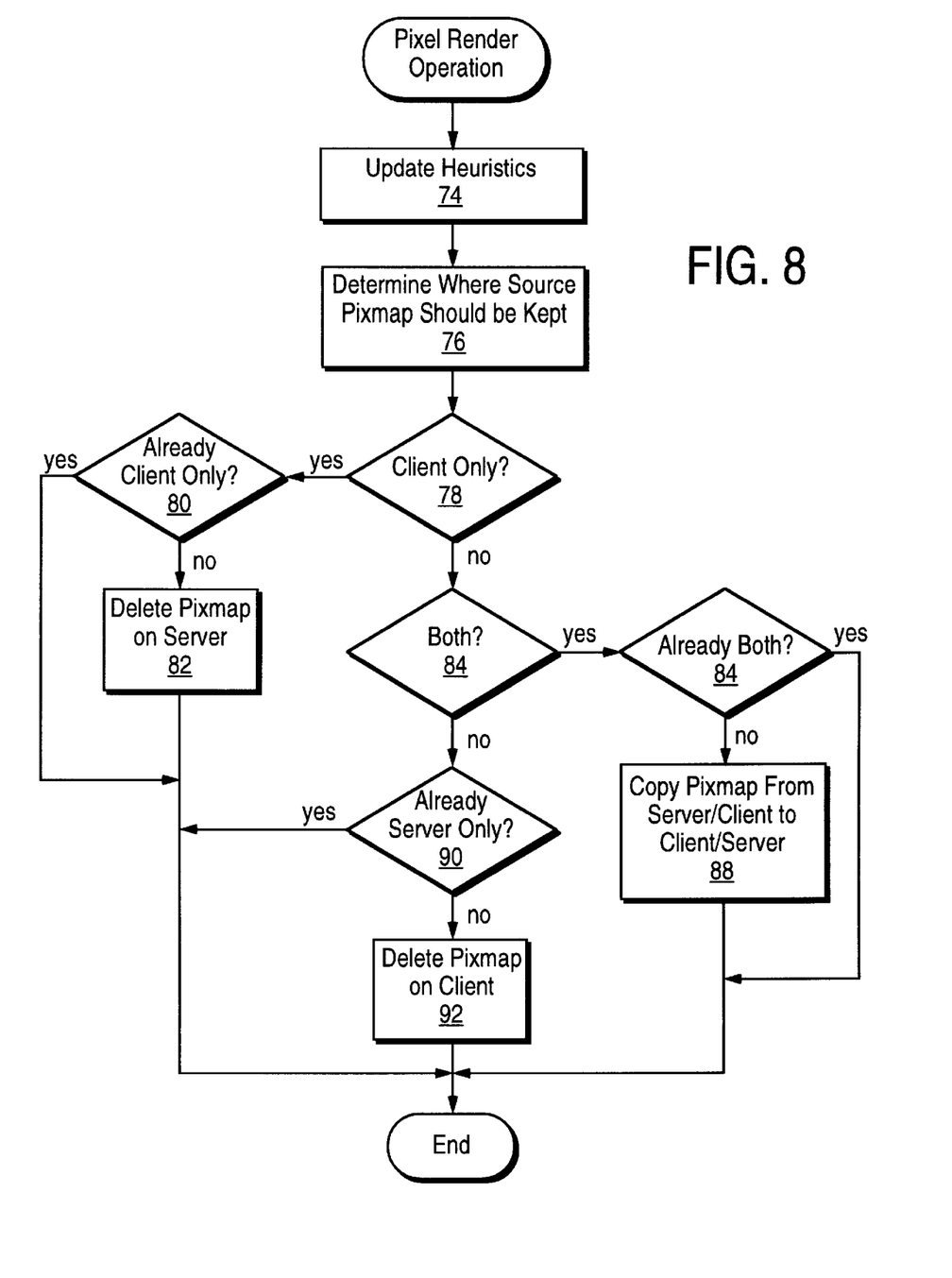
FIG. 8 illustrates one embodiment of the operation flow for migrating/shadowing a pixel map.

FIG. 8 illustrates one embodiment of the operational flow of pixel map management function 12 for maintaining a pixel map. As shown, for the illustrated embodiment, upon receipt of a pixel map rendering operation, e.g., BitBit, management function 12 updates heuristics 18, step 74. For the above described heuristics, management function 12 increments both global as well as the appropriate local usage counts 30 and 32. For the above described update policy, both global and local usage counts 30 and 32 are incremented, but not more than Max Migrate, if the source pixel map of the pixel map rendering operation is destined for client 20. However, both global and local usage counts 30 and 32 are decremented, but not below Min Migrate, if the source pixel map is destined for server 10 instead.

Upon updating both global and the appropriate local usage counts 30 and 32, management function 12 determines where the source pixel map is to be maintained in accordance with the migration/shadowing policy, which is based on the updated usage counts, step 76. If the determination result indicates that the source pixel map is to be maintained in client 20, step 78, management function 12 further determines if the source pixel map is currently being maintained on client 20 only, step 80. If the source pixel map is being maintained on client 20 only, no further action is taken; otherwise management function 12 deletes the source pixel map maintained on server 10, migrating the source pixel map onto client 20 only, step 82.

On the other hand, if the determination result indicates that the source pixel map is to be maintained in both server 10 and client 20, step 84, management function 12 further determines if the source pixel map is already being maintained on both server 10 and client 20, step 86. If the source pixel map is already being maintained on both server 10 and client 20, no further action is taken; otherwise management function 12 copies the source pixel map from server 10 to client 20 or vice versa, depending on where the source pixel map is currently maintained, thereby shadowing the source pixel map, step 88.

Finally, if the determination result indicates that the source pixel map is to be maintained in server 10 only, step 84, management function 12 further determines if the source pixel map is being maintained on server 10 only, step 90. If the source pixel map is being maintained on server 10 only, no further action is taken; otherwise management function 12 deletes the source pixel map from client 20, migrating the source pixel map onto server 10, step 92.

Figure 9:
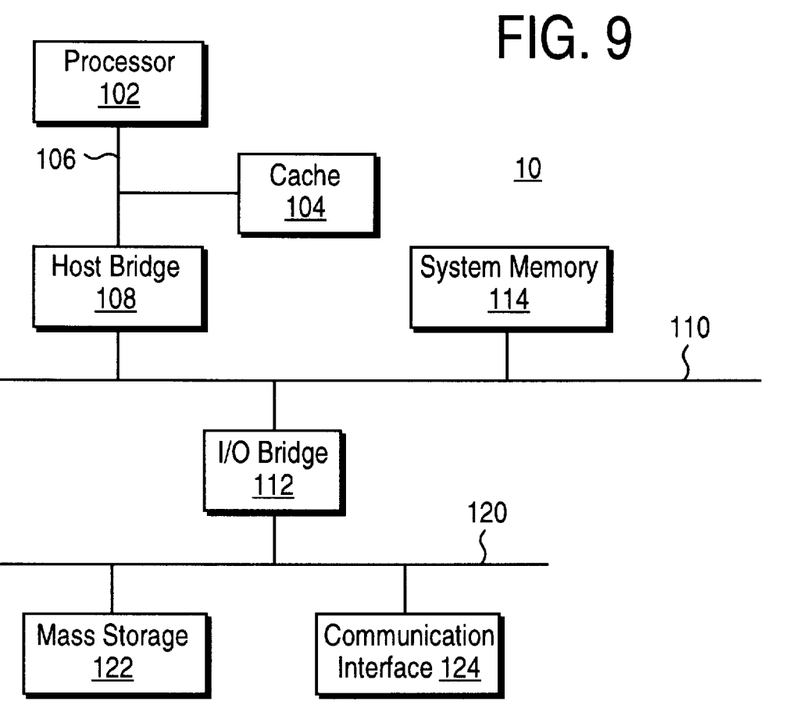
FIGS. 9–10 illustrate one embodiment each of a hardware and a software view of a computer system suitable for practicing the present invention.
Figure 10:
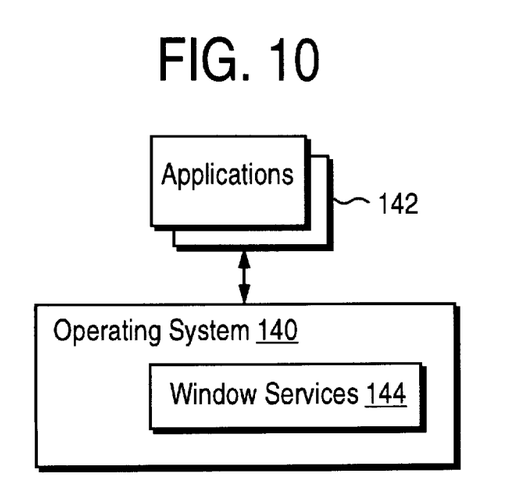

FIGS. 9–10 illustrate one embodiment each of a hardware and a software view of a computer system suitable for practicing the present invention. As shown in FIG. 9, for the illustrated embodiment, computer system 100 includes processor 102, processor bus 106, high performance I/O bus 110 and standard I/O bus 120. Processor bus 106 and high performance I/O bus 110 are bridged by host bridge 108, whereas I/O buses 110 and 120 are bridged by I/O bus bridge 112. Coupled to processor bus is cache 104. Coupled to high performance I/O bus 110 is system memory 114. Coupled to standard I/O bus 120 are mass storage 122, and communication interface 124.

These elements perform their conventional functions known in the art, in particular, mass storage 122 and system memory 114 are used to store a permanent and a working copy of management function 12, policies 16, heuristics 18 and pixel maps 14. Management function 12 is executed by processor 102 during operation. Communication interface 124 includes in particular a network interface, e.g., a ethernet adapter. Except for the teachings of the present invention, constitutions of these elements are known. Any one of a number of implementations of these elements known in the art may be used to form computer system 100 for practice of the present invention.

As shown in FIG. 10, software components of programmed computer system 100 includes operating system 140, and applications 142. Operating system 140 includes conventional memory management, file management, inter-process communication, data communication functions, and windowing service 144. Windowing services 144 include management function 12 and associated policies 16 and heuristics 18 of the present invention. Application 142 are intended to represent a broad category of applications known in the art, including in particular, those applications that use window services 144 of operating system 140.

While FIGS. 9–10 illustrate the practice of the present invention in a computer system, those skilled in the art will appreciate that the present invention may be practiced in the context of other apparatuses, in hardware as well as software embodiments. In particular, those skilled in the art will appreciate that the present invention is not limited to the embodiments described. The present invention can be practiced with modification and alteration within the spirit and scope of the appended claims. Accordingly, the description is to be regarded as illustrative instead of restrictive on the present invention.

Thus, a method and apparatus for migrating/shadowing data between a server and its clients have been described.

What is claimed is:

1. A method for migrating or shadowing data shared between a server and a client, the method comprising:
   a) creating a data on either the server only, both the server and the client, or the client only, in accordance with a creation policy that is heuristic in nature;
   b) migrating or shadowing the data between the server and the client, in accordance with a migration/shadowing policy that is heuristic in nature when the data is accessed.

2. The method as set forth in claim 1, wherein creating a data on either the server only, both the server and the client, or the client only comprises creating a data of interest on either the server only, both the server and the client, or the client only, depending on relative likelihood of usage between the server and the client as denoted by one or more usage counts.

3. The method as set forth in claim 1, wherein migrating or shadowing the data between the server and the client comprises migrating/shadowing a data of interest on either the server only, both the server and the client, or the client only, depending on relative usage between the server and the client as denoted by a one or more usage counts.

4. A method for migrating or shadowing data shared between a server and a client, the method comprising:
   a) maintaining one or more usage counts in accordance with an update policy; and
   b) creating the shared data on either the server only, on both the server and the client, or on the client only, in accordance with a creation policy that is based the maintained one or more usage counts.

5. The method as set forth in claim 4, wherein maintaining one or more usage counts comprises incrementing or decrementing a first usage count of the one or more usage counts depending on whether a data of interest is used by the apparatus or the client.

6. The method as set forth in claim 4, wherein creating the shared data comprises creating a data of interest on either the server only, both the server and the client, or the client only, depending on relative likelihood of usage between the server and the client as denoted by a first usage count of the one or more usage counts.

7. An apparatus comprising:
   (a) a storage medium having stored therein a plurality of programming instructions implementing a data management function that dynamically migrates or shadows data the apparatus shares with a coupled client, between the apparatus and the client, in accordance with a migration/shadowing policy that is heuristic in nature, wherein the data management function creates each data on either the apparatus only, both the apparatus and the client, or the client only, in accordance with a creation policy that is based on one or more usage counts; and
   (b) execution unit coupled to the storage medium to execute the programming instructions.

8. The apparatus as set forth in claim 7, wherein the data management function creates a data on both the apparatus and the client if the one or more usage counts indicate constructively equivalent likelihood of usage of the data by the apparatus and the client.

9. The apparatus as set forth in claim 7, wherein the data management function creates a data on both the apparatus and the client if the one or more usage counts indicate relative likelihood of usage of the data between the apparatus and the client is within a predetermined equivalency range.

10. The apparatus as set forth in claim 7, wherein the data management function creates a data on the apparatus only if the one or more usage counts indicate constructively more likelihood of usage of the data by the apparatus over the client.

11. The apparatus as set forth in claim 7, wherein the data management function creates a data on the apparatus only if the one or more usage counts indicate relative likelihood usage of the data between the apparatus and the client is within a predetermined range that favors the apparatus.

12. The apparatus as set forth in claim 7, wherein the data management function creates a data on the client only if the one or more usage counts indicate constructively more likelihood of usage of the data by the client over the apparatus.

13. The apparatus as set forth in claim 7, wherein the data management function creates a data on the client only if the one or more usage counts indicate relative usage of the data between the apparatus and the client is within a predetermined range that favors the client.

14. The apparatus as set forth in claim 7, wherein the data management function further updates the one or more usage counts in accordance with an update policy.

15. The apparatus as set forth in claim 14, wherein the data management function further increments a first usage count if a data of interest is used by the client, and decrements the first usage count if the data of interest is used by the apparatus.

16. The apparatus as set forth in claim 15, wherein the data management function constrains said increments and decrements of the first usage count with a ceiling and a floor limit.

17. The apparatus as set forth in claim 16, wherein the data management function further creates the pixel maps on either the apparatus only, both the apparatus and the client, or the client only, in accordance with a creation policy that is based on the one or more usage counts, which include a global usage count of all pixel maps.

18. The apparatus as set forth in claim 7, wherein the apparatus is a server.

19. An apparatus comprising:
a) operating logic for creating data shared with a client of the apparatus, on either the apparatus only, on both the apparatus and the client, or on the client only, in accordance with a creation policy that is heuristic in nature; and
b) operating logic for maintaining one or more usage counts in accordance with an update policy.

20. The apparatus as set forth in claim 19, wherein the operating logic for creating data creates new data on both the apparatus and the client on if the one or more usage counts indicate a constructive equivalency in likelihood of usage of the data by the apparatus and the client.

21. The apparatus as set forth in claim 19, wherein the operating logic for creating data creates new data on the apparatus only if the one or more usage counts indicate constructively more likelihood of usage of the data by the apparatus over the client.

22. The apparatus as set forth in claim 19, wherein the operating logic for creating data creates new data on the client only if the one or more usage counts indicate constructively more usage of the data by the client over the apparatus.

23. The apparatus as set forth in claim 19, wherein the operating logic for maintaining the one or more usage counts include operating logic for incrementing or decrementing a first usage count depending on whether a data of interest is used by the apparatus or the client.

* * * * *

UNITED STATES PATENT AND TRADEMARK OFFICE
CERTIFICATE OF CORRECTION

PATENT NO. : 6,006,238

DATED : December 21, 1999

INVENTOR(S) : Packard

It is certified that error appears in the above-identified patent and that said Letters Patent is hereby corrected as shown below:

Item [56], line 5, patent 5,637, 698, please delete date "6/1997" and insert -- 6/1994 --.

Item [56], line 10, patent 5,737, 536, please delete "Hermann et al." and insert -- Herrmann et al. --.

Signed and Sealed this

Fifteenth Day of May, 2001

Attest:

NICHOLAS P. GODICI

Attesting Officer

Acting Director of the United States Patent and Trademark Office